Figure 1:
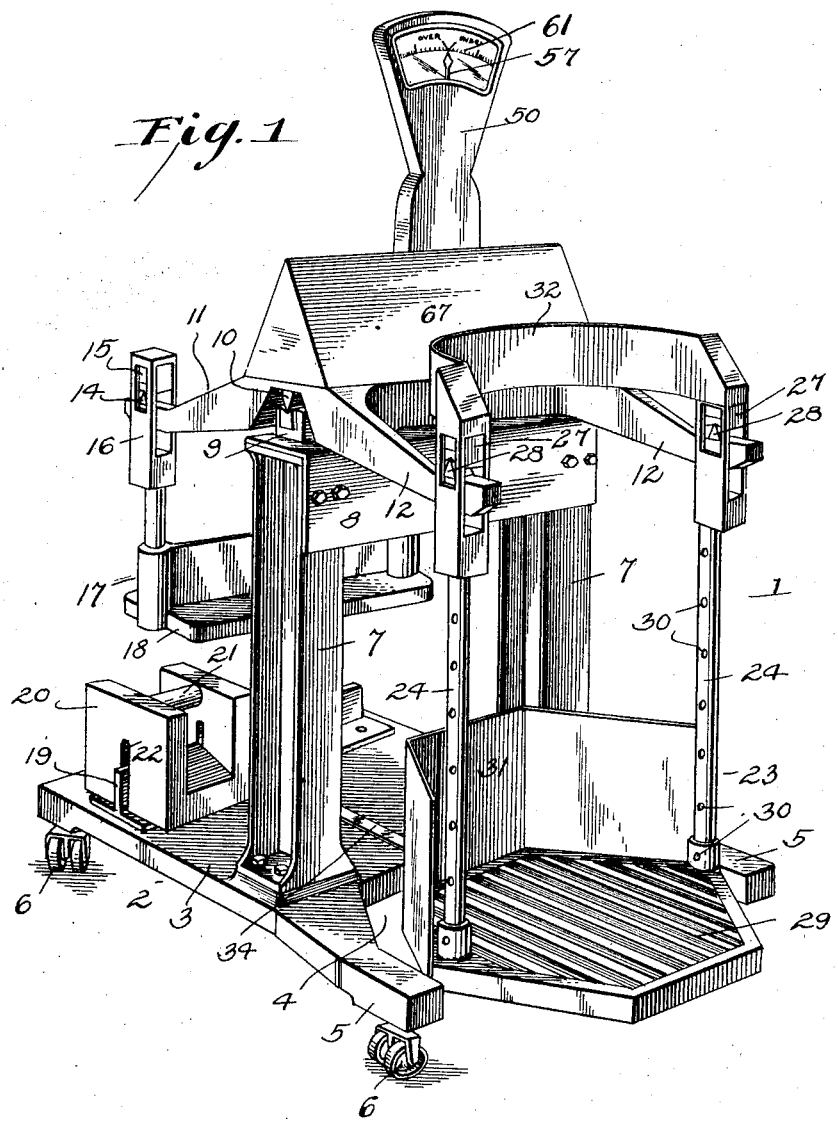

Nov. 5, 1929.  W. S. SMITH  1,734,098
SCALE
Filed July 29, 1927  3 Sheets-Sheet 1

Walter S. Smith, Inventor

By W. S. McDowell, Attorney

Nov. 5, 1929.  W. S. SMITH  1,734,098
SCALE
Filed July 29, 1927  3 Sheets-Sheet 2
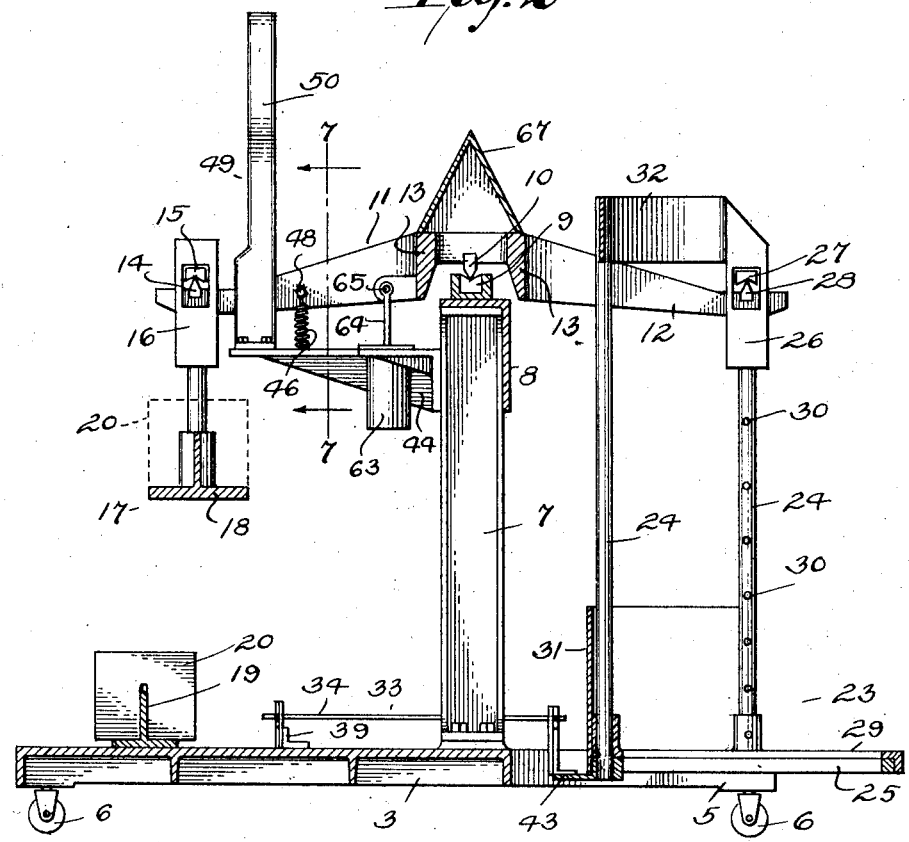
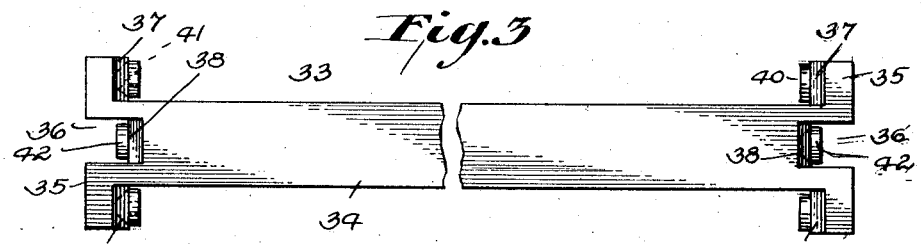
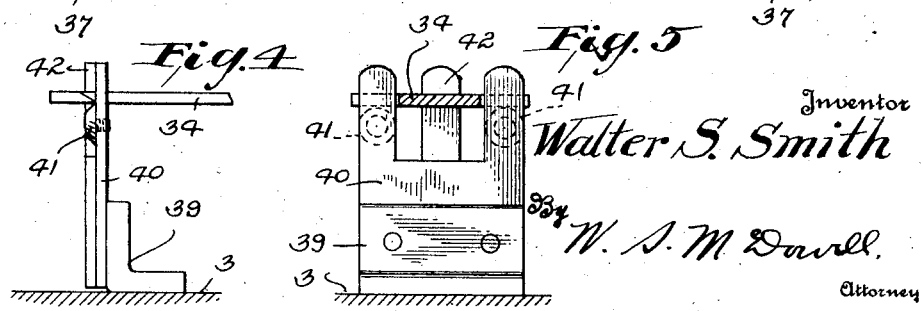

Nov. 5, 1929.                W. S. SMITH                1,734,098
                               SCALE
                        Filed July 29, 1927        3 Sheets-Sheet 3

Inventor
Walter S. Smith
By W. S. McDowell.
Attorney

Patented Nov. 5, 1929

1,734,098

UNITED STATES PATENT OFFICE

WALTER S. SMITH, OF COLUMBUS, OHIO

SCALE

Application filed July 29, 1927. Serial No. 209,350.

This invention relates to improvements in weighing scales and, more specifically, to scales of the type utilizing an even balanced beam or lever upon which weights are applied of an equal character on each side of the pivotal center or mounting of the beam in order that when the beam is in a state of balance the applied weight will equal the known or predetermined weight.

An outstanding object of the invention resides in the provision of a scale having a beam of this type and wherein the scale is designed particularly as a platform scale for the weighing of heavy, bulky commodities such as grain filled sacks, barrels containing various materials in bulk, and other relatively large and bulky products of the kind usually weighed upon ordinary platform scales. It is another object of the invention to provide a scale for weighing commodities of this kind with a greater degree of accuracy than has heretofore been obtained in practical operation, with the end in view of enabling under and over weights, with respect to a predetermined fixed weight, to be conveniently and accurately determined and correct weight thereby obtained.

Further objects of the invention reside in the provision of a platform or floor scale which is formed to include a frame, upon the upper part of which is pivotally mounted an even balance type of beam, one end of the beam being provided with a pivoted and suspended known weight receiver, while from the opposite end of the beam there is pivotally suspended a determinable weight receiver; in providing the determinable weight receiver with a commodity receiving base disposed closely adjacent to the floor surface, so as to minimize the labor and effort required in placing heavy sacks or the like on the determinable weight receiver and in the removal thereof; in cooperatively associating with the even balanced beam an indicating mechanism which arises above said frame and includes a travelling pointer, actuated by the movements of the beam, to visually denote the relation in position of said beam with respect to a normal or balanced position, whereby under or over weights may be quickly determined and corrections made, and in various other features of construction and arrangement which will be in part obvious and in part pointed out hereinafter.

Figure 6:
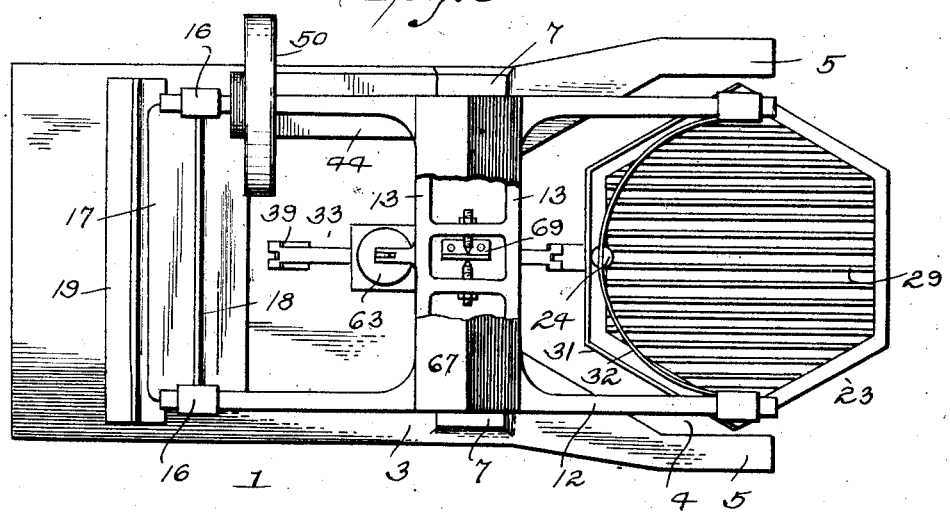
Figure 7:
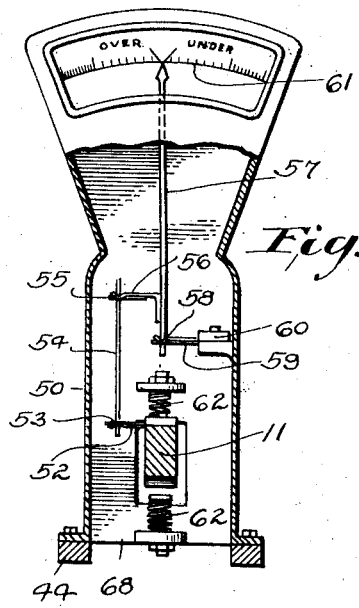
Figure 8:
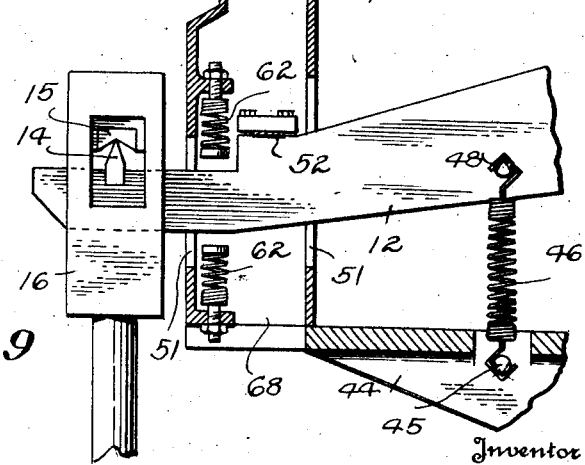
Figure 9:
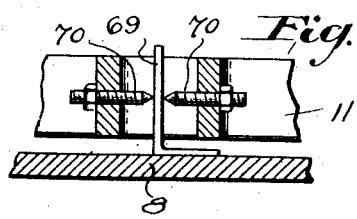

For a further understanding of the invention reference is to be had to the following description and the accompanying drawings, wherein:

Figure 1 is a perspective view of a weighing scale formed in accordance with the present invention, Figure 2 is a vertical longitudinal sectional view taken through the scale, Figure 3 is a plan view of the check rod mechanism, Figure 4 is a side elevation of one end of the check rod structure, Figure 5 is a detail front elevation of said check rod structure, a portion thereof being shown in vertical section, Figure 6 is a top plan view of the scale, Figure 7 is a vertical longitudinal sectional view taken through the indicating mechanism, Figure 8 is a similar view but taken on a plane perpendicular to that of Figure 7, Figure 9 is a detail sectional view taken through the means for maintaining the beam in its longitudinal position of adjustment.

Referring more particularly to the drawing the numeral 1 designates my improved scale in its entirety. The scale in this instance is formed to include a main supporting frame 2 which comprises a base casting 3 forming a horizontal table, the forward end of said casting being recessed as at 4 to provide forwardly extending legs 5. The base casting may be provided with depending rollers or casters 6 to facilitate the movement of the scale from place to place or the scale may be permanently positioned, as desired.

Arising from the base casting and rigidly secured thereto are uprights 7—7 which in this instance are in the form of channel members, and the upper end of these members are united by a transversely extending angle iron 8, which forms the upper part of the frame. Suitably mounted upon the cross member 8 are fulcrum blocks 9, in which are receivable the hardened steel knife edge trunnions 10 provided centrally upon an even balanced beam 11.

This beam is substantially of H shaped construction and includes longitudinally extending, parallel legs 12, which are united centrally by integral cross webs 13. The beam is mounted so as to rock in a poise manner on the block 9 and the trunnions 10. One end of the beam has its legs 12 provided with knife edge trunnions 14, which are receivable within fulcrum blocks 15 and mounted in connection with the yoke shaped upper end 16 of a known weight receiver 17. The receiver 17 is, therefore, pivotally suspended from one end of the beam or lever mechanism, and the lower portion of the receiver is formed to include a substantially T shaped base 18. The base casting 3 is formed to include a T shaped holder 19 for the reception of a plurality of fixed weights 20, which can be transferred if desired to the base 18 of the receiver 17 in order to apply a predetermined load upon one end of the beam structure, which is adapted to offset a determinable load carried by the other end of the beam or lever. The weights 20 are usually of U shaped configuration and are provided with handle bars 21, the lower portions of the weight 20 being slotted as at 22 in order to facilitate the positioning of said weights upon the vertical webs of the base 18 and the holder 19.

Depending from the end of the beam on the opposite side of the latter as regards the known weight receiver 17, is a commodity receiving or determinable weight receiver 23. The receiver 23 is constructed to comprise a frame consisting of a plurality of upright tubes or rods 24, the latter having their lower ends rigidly secured to a spider frame 25. The outer or forward rods 24 have their upper ends connected with casings 26, in which are arranged fulcrum blocks 27 for the reception of the inverted knife edges 28 provided upon the legs 12 of the beam 11. By this construction the commodity receiver as a whole is pivotally suspended from the beam mechanism in substantially the same manner as is the known weight receiver.

This spider frame loosely receives a grid base 29 which is adapted to receive the product placed upon the scale for weighing purposes. The base 29 is also provided with hubs which are slidably received upon the rods 24. These hubs together with the rods may be apertured as at 30 for the reception of removable pins (not shown) by means of which the grid may be adjusted vertically with respect to the frame of the commodity receiver so as to adapt the latter to commodities of varying proportions. The grid base 29 has its rear part provided with a wall 31, and this wall is utilized to assist in retaining bags or other holders in an upright position on the commodity receiver. Similarly, the upper end of the commodity receiver is provided with a semi-circular band 32, and this band in combination with the back rod 24 and the wall 31 prevents sagging on the part of a grain bag, for example, disposed on the commodity receiver. The grid base 29 is located, when the scale is handling large capacities, close to the floor line, and this is secured by the recess 4 in the front side of the base 3. It will be observed that the grid 29 is disposed substantially in the same horizontal plane as the base 3, see Figure 2.

The scale employs a check rod structure 33 which consists, in this instance, of a flat metallic strip 34 having laterally disposed enlargements 35 provided on the opposite ends thereof and longitudinally extending slots 36. The enlargements 35 are provided with beveled edges 37, while the inner edges of the slots 36 are reversely beveled as at 38. The edges 37 and 38 terminate, however, in the same plane or in relative alignment. One end of the check rod structure is carried in connection with a bracket 39 stationarily mounted on the base 3. This bracket is formed to include a U shaped plate 40, with which the edges 37 engage, as shown in Figures 4 and 5. Downward sliding movement of the check rod structure is prevented by means of conical heads 41, which are stationarily mounted on the upright arm of the plate 40 immediately below the enlargement 35. The plate 40 is also provided with a flexible bar 42, which is receivable within the slot 36 in one end of the check rod structure and engages with the beveled edge 38. By this arrangement the check rod structure can be readily connected with the base casting of the machine for free pivotal movement and, furthermore, with but a minimum of friction.

The opposite end of the check rod structure is similarly flexibly connected with the frame 25 of the commodity receiver. A bracket 43 is used in this connection and which corresponds exactly with the construction of the bracket 39. It will be understood that the distance between the brackets 39 and 43 corresponds precisely to the difference between the trunnions 10 and the knife edges 28.

Projecting from the rear side of the frame 2 is a bracket 44 to which is adjustably connected as at 45 the lower end of a coil spring 46, the upper end of said spring being connected with the beam 11 as at 48. The spring 46 serves to maintain the beam and an associated indicating mechanism 49, hereinafter described, in normal or neutral position. The commodity receiving end of the beam is sufficiently overweighted to balance the normal tensile pull of the spring 46.

Mounted upon the outer end of the frame 44 is an indicator casing 50, the lower end of which is provided with slots 51 through which oscillatably projects one of the legs 12 of the beam. This leg of the beam is provided, within the casing 50, with an offset arm 52 having the outer end thereof provided with V shaped seats 53, which are designed for the accommodation of the lower end of a floating link 54. The upper end of this link is provided with knife edges which are receivable within V shaped seats 55 provided in the outer end of an arm 56 which has its inner portion rigidly secured to the lower part of an indicator pointer 57, the extreme lower end of said pointer being pivotally received within V shaped seats 58 provided in a third set of arms 59, which are clamped as at 60 to the indicator casing 50. This arrangement is such that upon oscillation on the part of the beam mechanism, corresponding oscillation to a magnified extent is imparted to the pointer 57, the outer end of which travels over a graduated surface 61, and when the beam is normally positioned the pointer occupies the zero position on the scale or surface 61, but when the beam is deflected from such normal position the pointer is correspondingly moved relative to the scale or surface 61 to provide visual indication of the degrees of deflection, as it were, of the beam from its position of balance.

The scale 61, as shown in Figure 7, adjacent to its middle or zero position is provided with wide graduations to denote ounces and toward the opposite ends of the scale the graduations are more closely disposed to indicate pounds. Normally, the beam sensitively responds to applied weights as it approaches a position of balance, but when the beam reaches the extremes of its travel the same contacts or engages with one or the other of a pair of spaced springs 62 which are arranged within the indicator casing 50. These springs offer increased resistance to the oscillation of the beam which permits of the use of the pound graduations at the ends of the scale 61, the springs 62, therefore, serving to permit the scale to be read with greater convenience when the applied weights do not approximate the known weight. Normally, however, the springs 62 are out of engagement with the beam, as shown in Figure 8 and therefore do not interfere with the sensitiveness of the scale when positions of balance on the part of the beam are approached.

A dash pot 63 is carried by the frame 2 and the stem 64 thereof is pivotally connected as at 65 with one of the cross webs 13 of the beam 11. This dash pot may be of any standard design and is employed as usual to dampen the vibration of the beam and to accelerate the bringing of the beam to a balanced position in response to the application of determinable weights.

In view of the foregoing it will be seen that the present invention provides an even balance beam mechanism in a platform type of scale through the use of which extreme accuracy in weighing operations can be obtained, the scale being particularly useful in the weighing of sacked materials, such as flour or other grain, the scale being of such accuracy that variations of a fraction of an ounce in bulk materials weighing up to 150 pounds may be readily determined and corrected. The top of the beam over the fulcrum centers thereof is protected by a V shaped hood 67 which, when the scale is used in grain and flour mills, protects the knife edge fulcrums and prevents the accumulation of material therein which might have a tendency to interfere with the free pivotal movement of the beam. In this respect the bottom of the indicator casing 50 is open, as at 68 so as to prevent the accumulation of dust and other obstructing material therein. To prevent longitudinal shifting movement of the trunnions 10 within the blocks 9, the angle iron 8 of the frame 2 is provided with a fixed upright bracket 69, shown in Figure 9. Cooperative with this bracket are the pointed ends of a pair of aligned screws 70, which are mounted within threaded openings provided in the cross webs 13 of the beam 11. This construction serves to stabilize the operating positions of the beam and to prevent longitudinal crowding thereof against the blocks 9. The movable connections of the scale, it will be observed, have been provided with knife edges wherever possible in lieu of ordinary pivotal connections, since the knife edge construction is far more efficient in minimizing friction and this imparts to the scale a greater degree of accuracy without adding materially to the cost or complication thereof.

While I have described what I consider to be the preferred form of my improved scale, nevertheless it will be appreciated that various changes may be made therein from time to time, from the form of the invention herein disclosed, without departing from the spirit and principles of the invention as the latter are defined in the following claims.

What is claimed is:

1. In a scale, a frame, an even balance beam mounted on said frame and adapted to carry a weight receiver at its opposite ends, an indicator having graduations for indicating pounds and ounces, a pair of springs located near one of the outer ends of said beam, one of said springs being positioned above and the other below said beams and normally spaced therefrom, said springs serving to offer increased resistance to the beam at its extreme point of oscillation, which resistance is measured by the pound graduations of said indicator.

2. In a scale, a frame, a beam mounted for oscillation upon said frame, weight receiver carried by the outer ends of said beam, an indicator having two sets of graduations one for pounds and one for ounces, a pair of springs positioned to one side of the pivotal axis of said beam one of said springs being located above and the other below said beam, said springs being out of engagement with said beam when the latter is in a normal or balanced position and arranged to engage said beam so as to offer increased resistance thereto when the beam is rocked near its extreme points of oscillation, said increased resistance is measured by the pound graduations of said indicator.

3. In a scale, a frame, an even balanced beam provided centrally with knife edge trunnions, bearing blocks carried by said frame and arranged to receive said trunnions, a known weight receiver pivotally suspended from one end of said beam, a determinable weight receiver pivotally suspended from the other end of said beam, and means cooperative with said beam and frame for maintaining said knife edge trunnions in their longitudinal operating positions within said bearing blocks.

4. In a scale, a frame, a beam provided centrally and at the sides thereof with fixed knife edge trunnions, bearing blocks provided upon said frame for the reception of said trunnions, weight receivers pivotally suspended from the opposite ends of said beam, a stationary abutment carried by said frame, and means situated in alignment with said trunnions and engageable with said abutment to prevent longitudinal shifting of said trunnions within said blocks.

5. In a scale, a frame, a beam provided centrally with knife edge trunnions, bearing blocks mounted upon said frame for the reception of said trunnions, weight receivers pivotally suspended from the opposite ends of said beam, a stationary bracket carried by said frame, and oppositely disposed screws carried by said beam and situated in axial alignment with said trunnions and engageable with said bracket to maintain said trunnions in fixed longitudinal positions of operation within said blocks.

6. In a scale, a frame, an even balanced beam pivotally mounted on said frame, an indicator tower mounted on said frame, a pivotally movable pointer arranged within said tower, the outer end of said pointer being movable over a graduated surface, a laterally extending arm carried by said pointer adjacent to its pivotally supported end, a complemental arm carried by said beam, and a link uniting said arms.

7. In a scale, a frame, an even balanced beam pivotally mounted on said frame, a stationary indicator casing, an indicator pivotally mounted at one end within said casing and having the free end arranged for travel over a graduated surface, said indicator swinging in a plane perpendicular to that of the plane of swinging movement of said beam, complemental arms carried by said indicator and beam, and a motion transmitting link between said arms.

In testimony whereof I affix my signature.

WALTER S. SMITH.